United States Patent [19]
Kuhn

[11] 3,854,595
[45] Dec. 17, 1974

[54] MOBILE CRANE

[75] Inventor: Eberhard Kuhn, Hochdahl, Germany

[73] Assignee: Demag Baumaschinen Gesellschaft mit beschrankter Haftung, Dusseldorf, Germany

[22] Filed: Dec. 3, 1973

[21] Appl. No.: 421,503

[30] Foreign Application Priority Data
May 4, 1973   Germany............................ 2322383

[52] U.S. Cl............... 212/145, 280/81.5, 280/150.5
[51] Int. Cl............................................. B66c 23/62
[58] Field of Search.......... 212/145; 280/81 R, 81.5, 280/150.5, 444; 104/263

[56] References Cited
UNITED STATES PATENTS

| | | | |
|---|---|---|---|
| 2,346,900 | 4/1944 | Black | 212/145 |
| 2,914,194 | 11/1959 | Brown | 212/145 |
| 3,395,672 | 8/1968 | Ruf | 280/91 |

FOREIGN PATENTS OR APPLICATIONS

| | | | |
|---|---|---|---|
| 1,172,820 | 6/1964 | Germany | 212/145 |

*Primary Examiner*—Robert G. Sheridan
*Assistant Examiner*—Lawrence J. Oresky
*Attorney, Agent, or Firm*—Mandeville and Schweitzer

[57] ABSTRACT

A mobile multiaxle crane or similar heavy lift vehicle with pairs of lateral outriggers swiveling on vertical axes disposed on the side of the chassis is disclosed herein. These outriggers are pivotable outwardly away from the vehicle body to increase the stability thereof, and they may be swung back into the chassis profile in a unique manner for transport of the vehicle.

7 Claims, 2 Drawing Figures

MOBILE CRANE

BACKGROUND OF THE INVENTION

It has been common practice to provide the chassis of mobile cranes and similar hoisting rigs with lateral, expandable supporting arms or "outriggers" to increase the support basis for lifting or moving heavy loads. The length of the supporting or outrigger arms is one of the decisive factors for the degree of the stabilizing support basis and, consequently, for the tilting or upsetting moment of the vehicle. Therefore, it follows that, if all machine parts are designed accordingly, the maximum size of the load to be handled will be determined by the length of the supports.

The outrigger supports for heavy loads are ordinarily required to be very solid and hence are heavy and bulky. For this reason, it is rather difficult to disassemble these bulky, heavy elements during transport of the vehicle. This is not a particularly advantageous situation, since these vehicles must be made available and ready for operation as quickly as possible upon arrival at a job site.

It has been suggested to design the outrigger supports for swiveling motion about vertical axes for folding laterally to the chassis for transport of the vehicle. The supports must fold or collapse within predetermined outline measurements of the vehicle in order to comply with statutory restrictions on vehicle widths.

In British Pat. No. 1,215,223, the front supports of a mobile crane are folded into the chassis in such a way that the supports rest behind the front wheels in relation to the direction of travel of the vehicle. This design, however, requires that the length of the support be adjusted to the distance between the front axle and the support hinge. Since the front axle cannot simply be brought forward to desired optimum points for reasons of stability, the disclosure suggests that the supports be designed in telescopic fashion and that the longitudinally movable element be retracted to reduce its length during transport.

This type of support, as suggested in the British patent, however, is not very advantageous. First of all, the telescopic design requires considerable expenditure in construction resulting in high cost, and furthermore, even the retracted telescoping elements require so much space that the position of the vehicle axle must be stipulated. Particularly when dealing with very heavy vehicles, the chassis has to be extremely solid, as any pressure coming from the outrigger arm is exerted onto the chassis, thereby causing stresses, such as bending and torsion, the latter being aggravated by the large distances between front and rear support hinges.

SUMMARY OF THE PRESENT INVENTION

The major objective of the present invention is to improve the support of a vehicle, such as a mobile crane, while at the same time avoiding the disadvantages of earlier vehicles described hereinabove. More specifically, the new vehicle design must shorten the time required for making the unit available for operation, must reduce the construction costs of the outriggers, as well as the chassis itself, and must increase the support basis while maintaining easy handling of the outriggers.

These objectives are achieved by the present invention by folding the outrigger supports laterally against at least one of the chassis axles for transport and by providing the axle located adjacent the folded supports with a smaller length than the lengths of the remaining axles on the chassis.

This unique solution eliminates any restrictions on the length of the outriggers due to the wheel base dimensions, therefore, there is no need for telescoping outriggers. Moreover, the new unit may be made ready for operation simply by unfolding the fixed length outriggers. Furthermore, this arrangement facilitates the establishing of the outrigger supports in those locations where the forces will be the greatest, particularly in the immediate vicinity of the crane turntable. This, in turn, reduces the stresses applied to the rest of the chassis, in contrast with the prior art structures which transmitted stresses to the chassis. Therefore, the new chassis may be lighter in weight and, therefore, less expensive than comparable earlier ones of this type.

An important specific characteristic of the invention, the shorter lengths of those axles adjacent to the supports (shorter by at least the width of the outrigger supports when folded for transport) in comparison to the rest of the axles, ensures that the folded supports are within the limitations of traffic regulations for vehicle width.

The invention provides a favorable arrangement of two outriggers on each side of the vehicle to provide a quadripod support during use. Furthermore, two outrigger supports are arranged on each side in such a manner that they fold in the same direction and partially nest, one within the other, for transportation of the vehicle. To that end, the vertical pivot axis of the outrigger support closest to the chassis (while in transport) is located inwardly of the chassis outline by the approximate width of one outrigger, thereby making it possible to fold front and rear supports in the same direction and nest the latter in the former in a minimum of space.

In accordance with the principles of the invention, one or several of the chassis axles within the range of the outriggers supports are steerable. Moreover, the outriggers are supported, in accordance with the invention, on cup girders which directly absorb stresses and transmit them to the four corners of the support. Therefore, lifting shock forces will not affect the large components of the chassis. Rather, such forces will be absorbed by the supports where they originate. This new arrangement makes simpler and comparatively less expensive constructions of mobile crane units more feasible, and it also results in a chassis of less weight which benefits the weight/load capacity.

For a more complete understanding of the invention and a better appreciation of its attendant advantages, reference should be made to the following detailed description taken in conjunction with the accompany drawings.

DETAILED DESCRIPTION OF THE INVENTION

Figure 1:
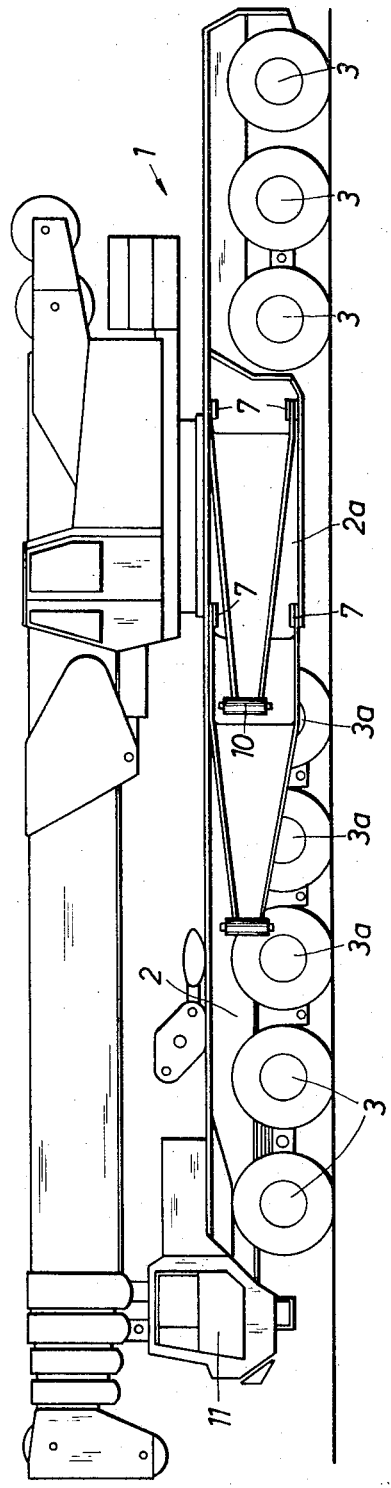
FIG. 1 is a side elevational view of a new mobile crane with outriggers folded for transit embodying the principles of the invention.
Figure 2:
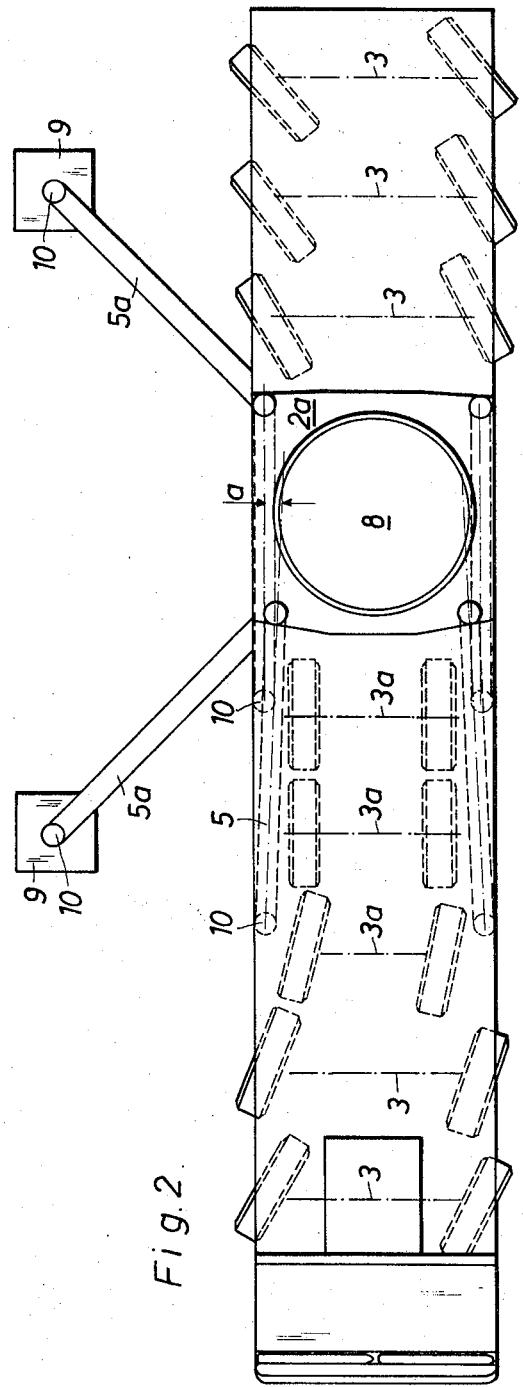
FIG. 2 is a plan view of the mobile crane of FIG. 1 with unfolded outriggers for lifting.

Referring now to FIG. 1, a mobile crane chassis 2, 2a, mounts in well-known fashion a turntable 8, a driver's cabin 11, and multiple vehicle axles 3, 3a. In that part of the chassis 2, where upper and lower portions of the vehicle are joined, the chassis includes a large cup-shaped girder member 2a; the remainder of the chassis elements 2 are relatively small box girders. The cup-shaped platform 2a of the chassis 2, supports vertical shafts 7 mounting two pivoting outriggers 5 at each side of the vehicle 1. The outriggers 5 comprise double T-shaped girders tapering somewhat towards their free ends. Vertically adjustable adapters 10 mounting support plates 9 are supported at the free ends of supports 5. During the hoisting operation of the unit 1, the outriggers 5, as shown in phantom in FIG. 2 at 5a, are swung outwardly from the vehicle, thereby increasing the support basis of the same.

For transport of the mobile crane, the outriggers 5 are folded into the chassis 2, after the plates 9 have been removed.

The rear as well as the front outriggers are folded towards the front in a manner whereby the tapered free ends of the rear outriggers 5 cover portions of and actually nest within the profiles of the front outriggers 5. Axles 3a, located between the right and left folded outriggers 5, are of a smaller length than that of the remaining axles 3, in order that the outriggers 5 do not project laterally outwardly of the predetermined vehicle width limitations. On the road, the infolded outriggers 5 are held in place by appropriate locking devices (not shown). The forwardmost axle 3a, with the smaller spacing of its wheels, is steerable, as are the other axles 3, with wider wheel spacing. A predetermined gap between the infolded outriggers 5 and the wheels is, of course, to accommodate turning of the same. In order to achieve the optimum nesting and economy of space for the infolding of outriggers 5, the forward pivot axles 7 are displaced inwardly toward the vehicle axis (longitudinal centerline) by an amount $a$, equal to the width of an outrigger 5, in relation to the location of the rear pivot axles 7.

Other forms of design are, of course, feasible, e.g., it would be possible, with suitable chassis design, to fold one or both of the outriggers 5 on each side rearwardly.

The mobile crane of the invention herein illustrated and described is intended to be representative only, as certain changes may be made therein without departing from the teachings of the disclosure. Accordingly, reference should be made to the following appended claims in determining the full scope of the invention.

I claim:

1. A mobile crane or like vehicle having a chassis of predetermined width and two pairs of outrigger arms pivotable laterally outwardly to increase the support basis of the vehicle foldable back into the chassis for transport of the vehicle, characterized in that
   a. a plurality of wheel supporting first axles are mounted on said chassis, the forwardmost and rearwardmost of said first axles having a first predetermined length generally equal to the width of said chassis;
   b. a plurality of wheel supporting second axles of a second predtermined length, smaller than said first predetermined length, mounted on said chassis between said first axles;
   c. means mounting said outrigger arms to said chassis adjacent said second axles of smaller length, whereby said outrigger arms are nested within the chassis vehicle width and in juxtaposition to wheels supported by said second axles when said arms are folded against the chassis for vehicle transport.

2. A mobile crane or like vehicle in accordance with claim 1, further characterized in that
   a. the length of said second axles is shorter than the length of the first axles by an amount equal to the width of the outriggers when folded for transport.

3. A mobile crane or like vehicle according to claim 1, in which
   a. said means supporting said outrigger arms inclues two pivot vertical axles arranged on each side of the chassis.

4. A mobile crane or like vehicle in accordance with claim 1, in which
   a. the pair of outrigger arms arranged on each side of the vehicle fold in the same direction for transport of the vehicle.

5. A mobile crane or like vehicle according to claim 3, in which
   a. one of the vertical pivot axles mounting the outrigger arms is closer to the chassis longitudinal axis than the other by an amount generally equal to the width of one outrigger arm.

6. A mobile crane or like vehicle according to claim 1, in which
   a. at least one of said second axles mount steerable wheels.

7. A mobile crane or like vehicle according to claim 6, in which
   a. at least said forwardmost and rearwardmost first axles mount steerable wheels.

* * * * *